US008494290B2

United States Patent
Cohen et al.

(10) Patent No.: US 8,494,290 B2
(45) Date of Patent: Jul. 23, 2013

(54) METHOD FOR CODING PICTURES USING HIERARCHICAL TRANSFORM UNITS

(75) Inventors: Robert A. Cohen, Somerville, MA (US); Anthony Vetro, Arlington, MA (US); Huifang Sun, Woburn, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 247 days.

(21) Appl. No.: 13/169,959

(22) Filed: Jun. 27, 2011

(65) Prior Publication Data

US 2012/0281928 A1     Nov. 8, 2012

Related U.S. Application Data

(60) Provisional application No. 61/482,873, filed on May 5, 2011.

(51) Int. Cl.
    *G06K 9/36*           (2006.01)

(52) U.S. Cl.
    USPC ........................................................ 382/232

(58) Field of Classification Search
    USPC ......... 382/232–233, 236, 238–240, 244–250; 375/240.11, 240.18–240.19, 240.22; 348/395.1, 348/400.1–403.1, 408.1–413.1, 416.1, 420.1–421.1; 708/317, 400–405
    See application file for complete search history.

(56) References Cited

U.S. PATENT DOCUMENTS

| | | | | | |
|---|---|---|---|---|---|
| 4,751,742 | A | * | 6/1988 | Meeker | 382/240 |
| 5,315,670 | A | * | 5/1994 | Shapiro | 382/240 |
| 5,546,477 | A | * | 8/1996 | Knowles et al. | 382/242 |
| 5,602,589 | A | * | 2/1997 | Vishwanath et al. | 375/240.11 |
| 5,748,786 | A | * | 5/1998 | Zandi et al. | 382/240 |
| 5,881,176 | A | * | 3/1999 | Keith et al. | 382/248 |
| 6,118,902 | A | * | 9/2000 | Knowles | 382/240 |

OTHER PUBLICATIONS

Joint Collaborative Team on Video Coding (JCT-V C) of ITU-T SG16 WP3 and ISO/IEC JTC1/SC29/AWG11 5th Meeting: Geneva, Mar. 16-23, 2011, p. 1-7.

Detlev Marpe; "Video Compression Using Nested Quadtree Structures, Leaf Merging and Improved Techniques for Motion Representation and Entropy Coding;" IEEE Transactions on Circuits and Systems for Video Technology; pp. 1-10.

* cited by examiner

Primary Examiner — Jose Couso
(74) Attorney, Agent, or Firm — Dirk Brinkman; Gene Vinokur

(57) ABSTRACT

A bitstream includes coded pictures, and split-flags for generating a transform tree. The bit stream is a partitioning of coding units (CUs) into Prediction Units (PUs). The transform tree is generated according to the split-flags. Nodes in the transform tree represent transform units (TU) associated with the CUs. The generation splits each TU only if the corresponding split-flag is set. For each PU that includes multiple TUs, the multiple TUs are merged into a larger TU, and the transform tree is modified according to the splitting and merging. Then, data contained in each PU can be decoded using the TUs associated with the PU according to the transform tree.

20 Claims, 6 Drawing Sheets

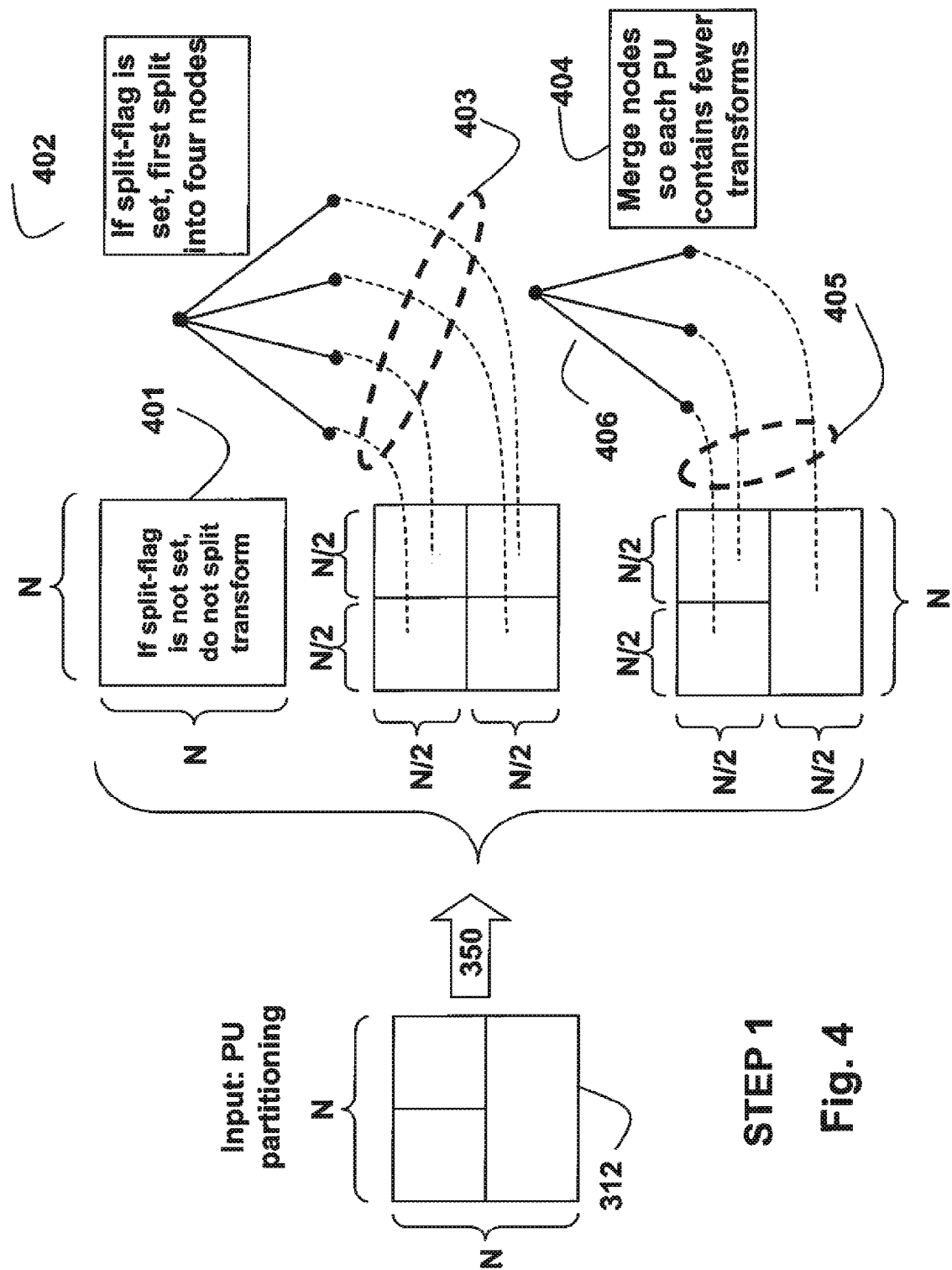

METHOD FOR CODING PICTURES USING HIERARCHICAL TRANSFORM UNITS

RELATED APPLICATION

This U.S. Application claims priority to U.S. Provisional Application 61/482,873, "Method for Representing Hierarchical Transforms for Image and Video Coding," filed by Cohen et al. on May 5, 2011.

FIELD OF THE INVENTION

The invention relates generally to coding pictures, and more particularly to methods for coding pictures using hierarchical transform units in the context of encoding and decoding pictures.

BACKGROUND OF THE INVENTION

For the High Efficiency Video Coding (HEVC) standard currently under development as H.264/MPEG-4 AVC, the application of TUs to residual blocks is represented by a tree as described in "Video Compression Using Nested Quadtree Structures, Leaf Merging, and Improved Techniques for Motion Representation and Entropy Coding," IEEE Transactions on Circuits and Systems for Video Technology, vol. 20, no. 12, pp. 1676-1687, December 2010.

Coding Layers

The hierarchical coding layers defined in the standard include video sequence, picture, slice, and treeblock layers. Higher layers contain lower layers.

Treeblock

According to the proposed standard, a picture is partitioned into slices, and each slice is partitioned into a sequence of treeblocks (TBs) ordered consecutively in a raster scan. Pictures and TBs are broadly analogous to frames and macroblocks, respectively, in previous video coding standards, such as H.264/AVC. The maximum allowed size of the TB is 64×64 pixels luma (intensity), and chroma (color) samples.

Coding Unit

A Coding Unit (CU) is the basic unit of splitting used for Intra and Inter prediction. Intra prediction operates in the spatial domain of a single picture, while Inter prediction operates in the temporal domain among the picture to be predicted and a set of previously-decoded pictures. The CU is always square, and can be 128×128 (LCU), 64×64, 32×32, 16×16 and 8×8 pixels. The CU allows recursive splitting into four equally sized blocks, starting from the TB. This process gives a content-adaptive coding tree structure comprised of CU blocks that can be as large as the TB, or as small as 8×8 pixels.

Prediction Unit (PU)

A Prediction Unit (PU) is the basic unit used for carrying the information (data) related to the prediction processes. In general, the PU is not restricted to being square in shape, in order to facilitate partitioning, which matches, for example, the boundaries of real objects in the picture. Each CU may contain one or more PUs, Transform Unit (TU)

As shown in FIG. 1, a root node 101 of the transform tree 100 corresponds to an N×N TU or "Transform Unit" (TU) applied to a block of data 110. The TU is the basic unit used for the transformation and quantization processes. In the proposed standard, the TU is always square and can take a size from 4×4 to 32×32 pixels. The TU cannot be larger than the PU and does not exceed the size of the CU. Multiple TUs can be arranged in a tree structure, henceforth—transform tree.

Each CU may contain one or more TUs, where multiple TUs can be arranged in a tree structure.

The example transform tree is a quadtree with four levels 0-3. If the transform tree is split once, then four N/2×N/2 TUs are applied. Each of these TUs can subsequently be split down to a predefined limit. For Intra-coded pictures, transform trees are applied over "Prediction Units" (PUs) of Intra-prediction residual data. These PUs are currently defined as squares or rectangles of size 2N×2N, 2N×N, N×2N, or N×N pixels. For Intra-coded pictures, the square TU must be contained entirely within a PU, so the largest allowed TU size is typically 2N×2N or N×N pixels. The relation between a-j TUs and a-j PUs within this transform tree structure is shown in FIG. 1.

As shown in FIG. 2, a new PU structures has been proposed for the proposed HEVC standard as described by Cao, et al. "CE6.b1 Report on Short Distance Intra Prediction Method (SDIP)," JCTVC-E278, March 2011. With the SDIP method, PUs can be strips or rectangles 201 as small as one or two pixels wide, e.g. N×2, 2×N, N×1, or 1×N pixels. When overlaying a transform tree on an Intra-coded block that has been partitioned into such narrow PUs, the transform tree is split to a level where the size of the TU is only 2×2 or 1×1. The TU size cannot be greater than the PU size; otherwise, the transformation and prediction process is complicated. The prior art SDIP method that utilizes these new PU structures define, for example, as 1×N and 2×N TUs. Due to the rectangular TU sizes, the prior art is not compatible with the transform tree structure that is in the current draft specification of the HEVC standard. The SDIP does not use the transform tree mandated in the standard, instead the TU size is implicitly dictated by the sizes of the PUs.

Hence, there is a need for a method of splitting and applying square and rectangular TUs on rectangular, and sometimes very narrow rectangular PUs, while still maintaining the tree structure of the TUs as defined by the proposed standard.

SUMMARY OF THE INVENTION

A bitstream includes coded pictures, and split-flags. The split flags are used for generating a transform tree. Effectively, the bit stream is a partitioning of coding units (CUs) into Prediction Units (PUs).

The transform tree is generated according to the split-flags. Nodes in the transform tree represent transform units (TU) associated with CUs.

The generation splits each TU only if the corresponding split-flag is set.

For each PU that includes multiple TUs, the multiple TUs are merged into a larger TU, and the transform tree is modified according to the splitting and merging.

Then, data contained in each PU can be decoded using the TUs associated with the PU according to the transform tree.

BRIEF DESCRIPTION OF THE DRAWINGS

FIG. 4 is a diagram of a first step of the transform tree generation according to this invention.

DETAILED DESCRIPTION OF THE INVENTION

The embodiments of our invention provide a method for coding pictures using hierarchical transform units (TUs). Coding encompasses encoding and decoding. Generally, encoding and decoding are performed in a codec (CODer-DECcoder. The codec is a device or computer program capable of encoding and/or decoding a digital data stream or signal. For example, the coder encodes a bit stream or signal for compression, transmission, storage or encryption, and the decoder decodes the encoded bit stream for playback or editing.

The method applies square and rectangular TUs on rectangular, and sometimes very narrow rectangular portions of pictures, while still maintaining a hierarchical transform tree structure of the Transform in Units (TUs) as defined in the High Efficiency Video Coding (HEVC) standard. Transforms can refer either to transforms or inverse transforms. In the preferred embodiment, the transform tree is a quadtree (Q-tree), however other tree structures, such a binary trees (B-tree) and octrees, generally N-ary trees are also possible.

Input to the method is an N×N coding unit (CU) partitioned into Prediction Units (PUs). Our invention generates a transform tree that is used to apply TUs on the PUs.

Decoding System

Figure 1:
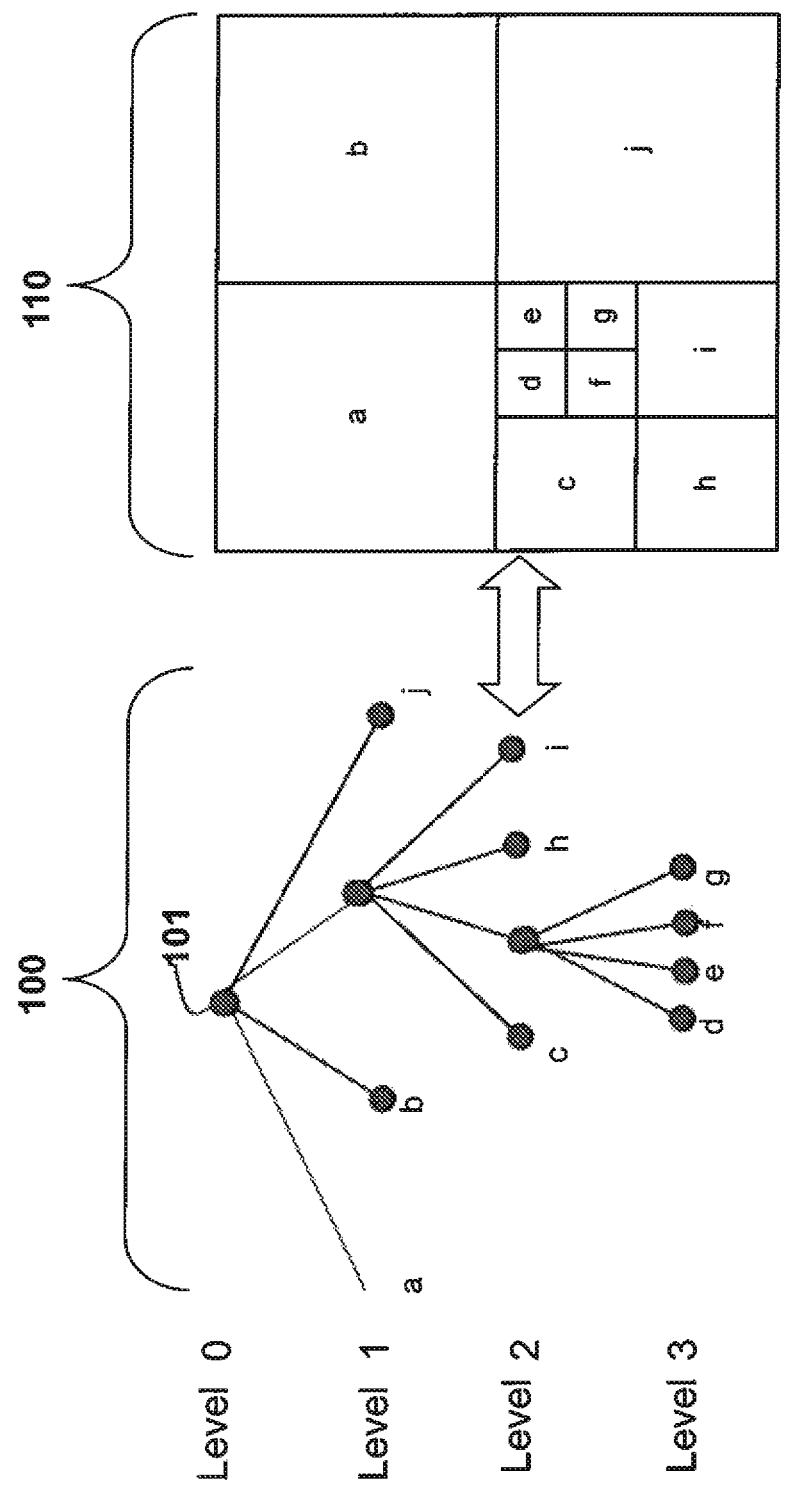
FIG. 1 is diagram of a tree splitting for transform units according to the prior art.
Figure 2:
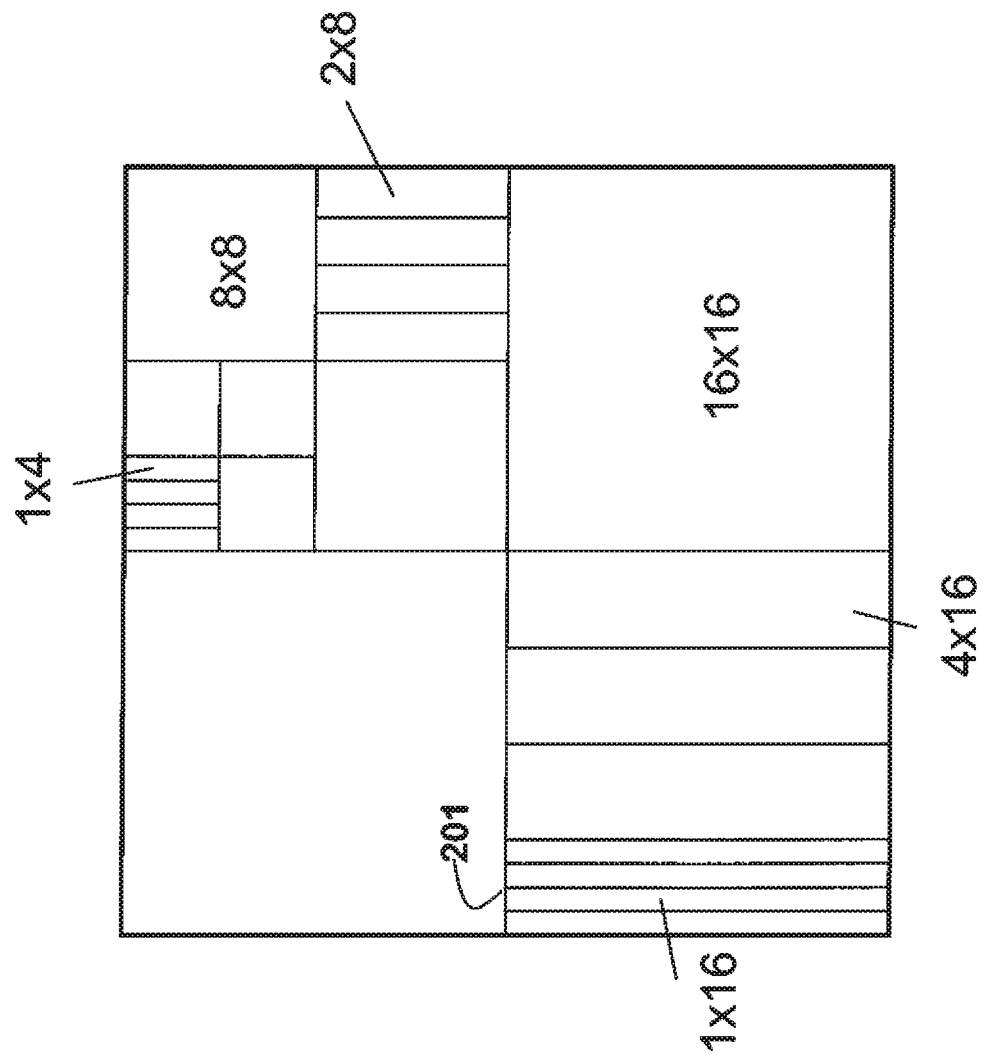
FIG. 2 is diagram of a decomposition into rectangular prediction units according to the prior art.
Figure 3A:
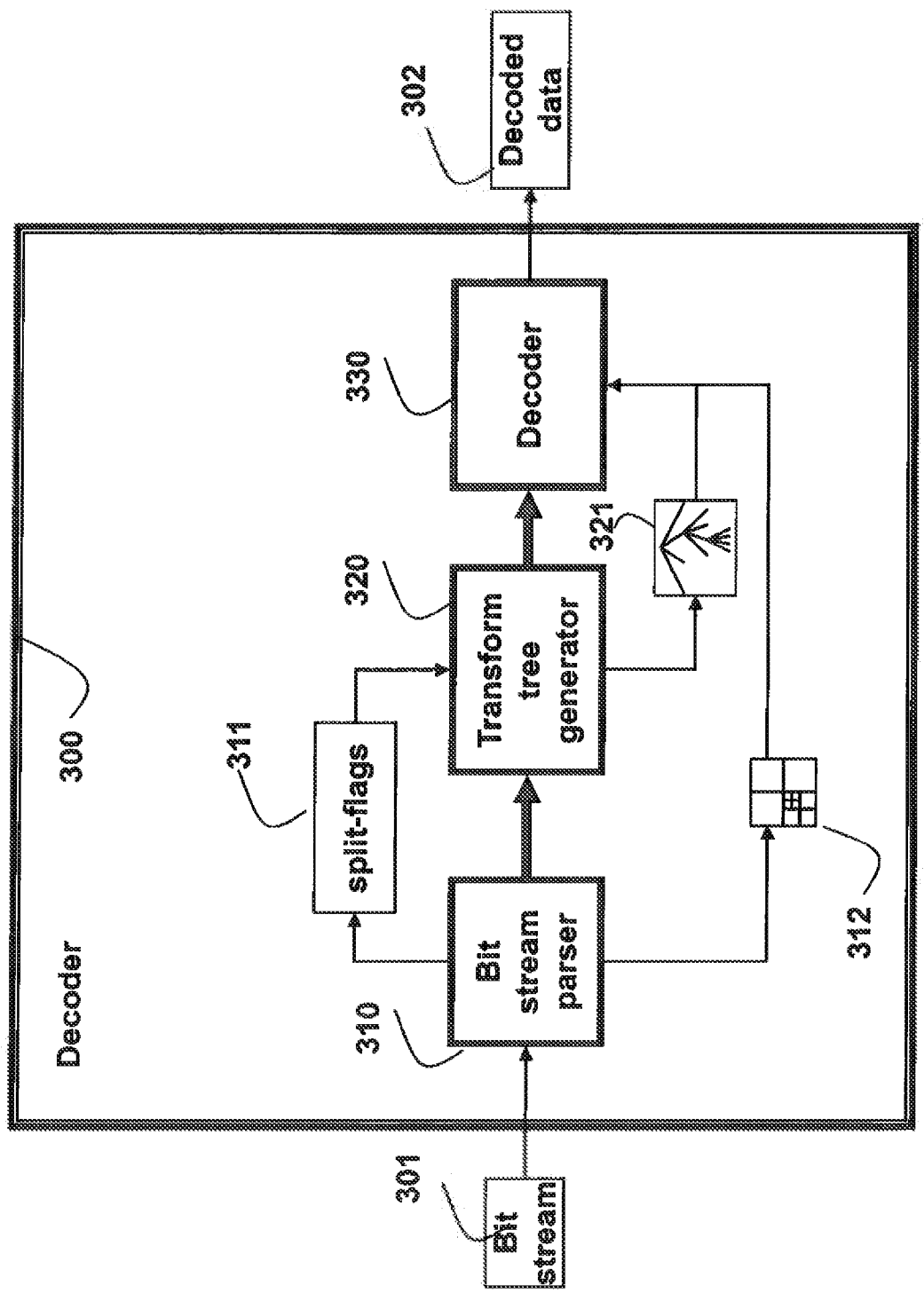
FIG. 3A is a flow diagram of an example decoding system used by embodiments of the invention.
Figure 3B:
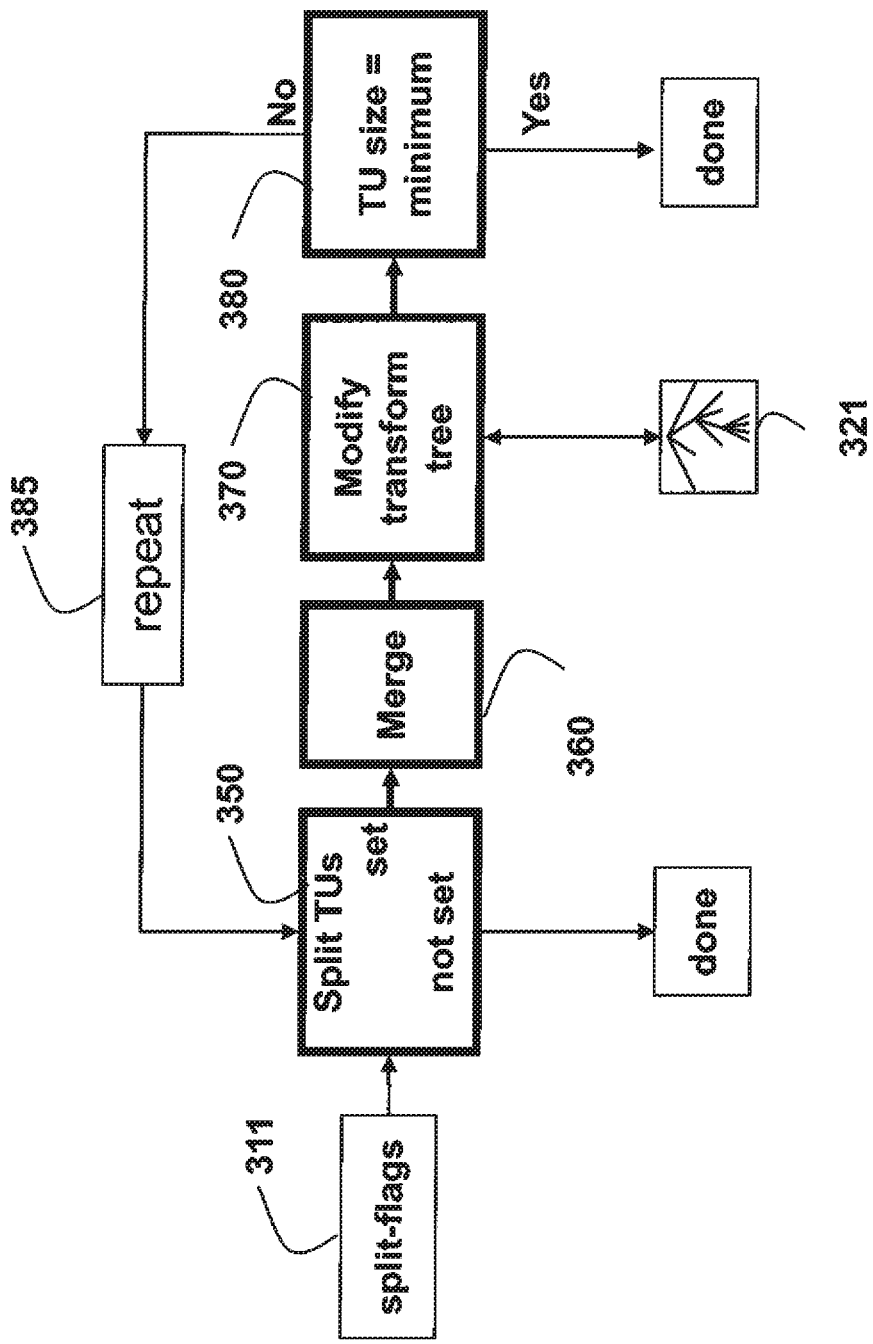
FIG. 3B is a flow diagram of transform tree generation used by embodiments of the invention.

FIGS. 3A-3B show an example decoder and method system 300 used by embodiments of the invention, i.e., the steps of the method are performed by the decoder, which can be software, firmware or a processor connected to a memory and input/output interfaces as known in the art.

Input to the method (or decoder) is a bit stream 301 of coded pictures, e.g., an image or a sequence of images in a video. The bit stream is parsed 310 to obtain split-flags 311 for generating the transform tree. The split-flags are associated with TUs of corresponding nodes of a transform tree 221, and data 312 to be processed, e.g., N×N blocks of data. The data includes a partitioning of the coding units (CUs) into Prediction Units (PUs).

In other words, any node represents a TU at a given depth in the transform tree. In most cases, only TUs at leaf nodes are realized. However, the codec can implement the TU at nodes higher in the hierarchy of the transform tree.

The split-flags are used to generate 320 a transform tree 321. Then, the data in the PUs are decoded according to the transform tree to produce decoded data 302.

The generation step 320 includes splitting 350 each TUs only if the split-flag 311 is set.

For each PU that includes multiple TUs, the multiple TUs are merged into a larger TU. For example, a 16×8 PU can be partitioned by two 8×8 TUs. These two 8×8 TUs can be merged into one 16×8 TU. In another example, a 64×64 square PU is partitioned into sixteen 8×32 TUs. Four of these TUs are merged into a 32×32 square TU, and the other TUs remain as 8×32 rectangles. The merging solves the problem in the prior art of having many very small, e.g., 1×1 TUs, see Cao, et Then, the transform tree 321 is modified 370 according splitting and merging.

The splitting, partitioning, merging and modifying can be repeated 385 until a size of the TU is equal to a predetermined minimum 380.

After the transform tree has been generated 320, the data 312 contained in each PU can be decoded using the TUs associated with the PU.

Various embodiments are now described.

Embodiment 1

FIG. 4 shows the partitioning 312 of the input CU into PUs 312, the iterative splitting 350 (or not) of the PUs according to split-flags, and the subsequent merging.

Step 1: A root node of the transform tree corresponds to an inital N×N TU covering the N×N PU 312. The bit stream 301 received by the decoder 300, as shown in FIG. 3, contains the split-flag 311 that is associated with this node. If the split-flag is not set 401, then the corresponding TU is not split, and the process for this node is complete. If the split-flag is set 402, then the N×N TU is split into TUs 403. The number of TUs produced corresponds to the structure of the tree, e.g., four for a quadtree. It is noted that the number of TUs produced by the splitting can vary.

Then, the decoder determines the PU includes multiple than TUs. For, example, a rectangular PU includes multiple TUs, e.g., two square TUs, each of size N/2×N/2. In this case, the multiple TUs in that PU are merged 404 into an N×N/2 TU or an N/2×N rectangular TUs 405 aligned with the dimensions of the PU. The rectangular PUs and TUs can include longer axes corresponding to lengths, and a shorter axis corresponding to widths. Merging square TUs into larger rectangular TUs eliminates the problem where a long narrow rectangle can be split into many small square TUs, as in the prior art, see Cao et al. Merging also reduces the number of TUs in the PUs.

Having many small TUs is usually less effective than having a few larger TUs, especially when the dimensions of these TUs are small, or when multiple TUs cover similar data.

The transform tree is then modified. The branch of the transform tree that corresponded with the first N/2>N/2 TUs 406 is redefined to correspond to the merged rectangular TU, and the branch of the transform tree that corresponded to the second merged TU is eliminated.

Step 2: For each node generated in Step 1, if a size of the TU is equal to a predefined minimum, the process is done for that node. Each remaining node is further split when the associated split-flag is set, or if the TU for that node is not contained entirely within the PU.

Figure 5:
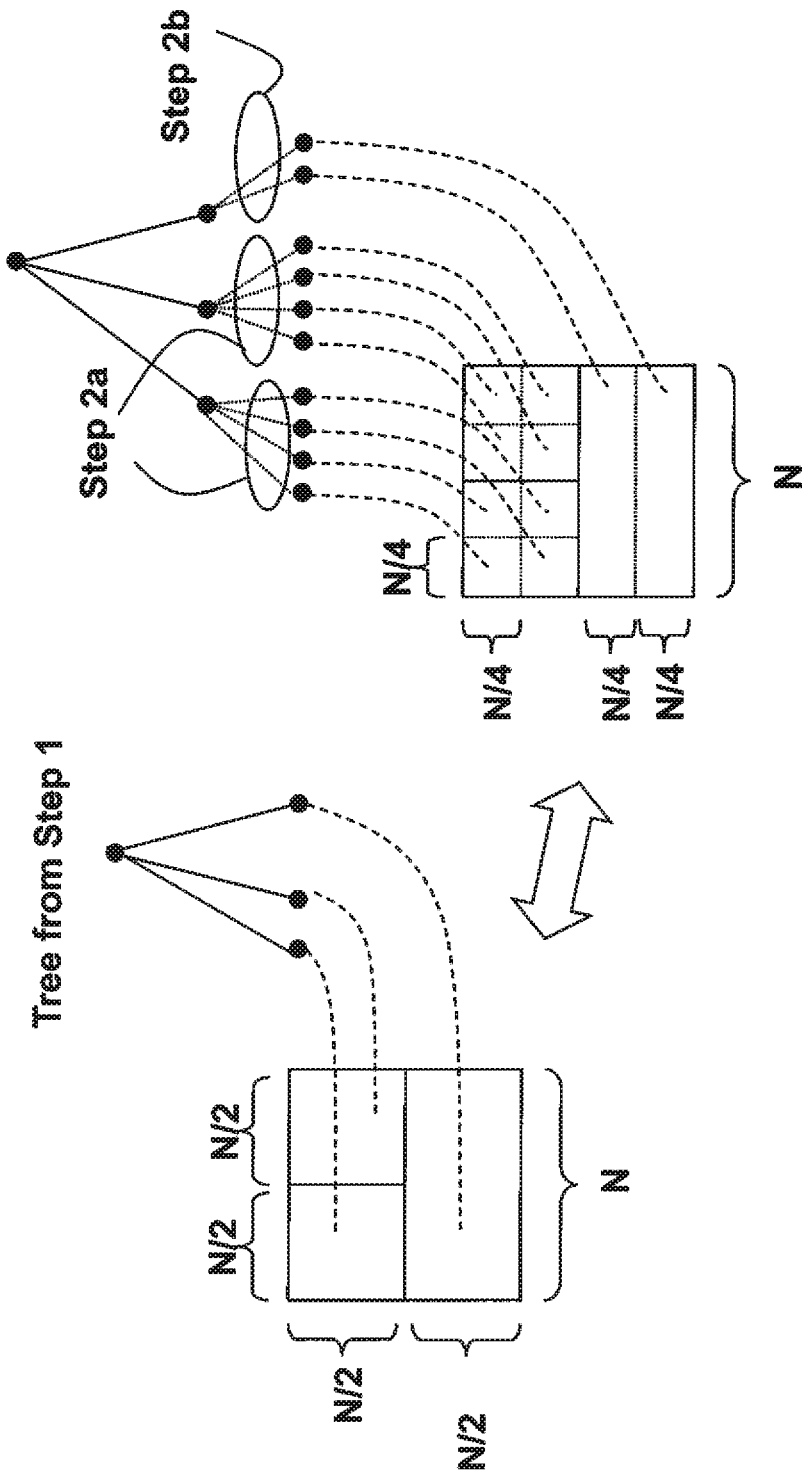
FIG. 5 is a diagram of a second step of the transform tree generation according to this invention.

Unlike Step 1, however, the way that the node is split depends upon the shape of the PU, as shown in FIG. 5, because the PUs can have arbitrary shapes and sizes. This splitting is performed as described in Step 2*a* or Step 2*b* below. The decision whether to look for the split-flag in the bit stream or to split when the TU covers more than one PU can be made beforehand, i.e., the system is defined such that the split-flag is signaled in the bit stream, or the split-flag is inferred based upon criteria such as minimum or maximum TU sizes, or whether a TU spans multiple PUs.

Implicit Split-Flag

Alternatively, an "implicit split-flag" can be parsed from the bit stream 301. If the implicit split-flag is not set, then the split-flag is signaled for the corresponding node. If the implicit split-flag is set, then the split-flag is not signaled for this node, and the splitting decision is made based on predefined split conditions. The predefined split conditions can include other factors, such as whether the TU spans multiple PUs, or if the TU size limitation is met. In this case, the implicit split-flag is received before the split-flag, if any.

For example, the implicit split-flag can be received before each node, before each transform tree, before each image or video frame, or before each video sequence. For Intra PUs, a TU is not allowed to span multiple PUs because the PU is predicted from a set of neighboring PUs, so those neighboring PUs are to be fully decoded, inverse transformed, and reconstructed in order to be used for predicting the current PU.

In another example, the implicit flag cannot be set, but predefined metrics or conditions are used to decide whether to split a node without requiring the presence of a split-flag.

Step 2a: If the TU for this node is square, the process goes back to Step 1 treating this node as a new root node and splitting it into four square TUs, e.g., of size N/4×N/4.

Step 2b: If the TU for this node is rectangular, e.g., N/2×N, then the node is split into two nodes corresponding to N/4×N TUs. Similarly, an N×N/2 TU is split into two nodes corresponding to N×N/4 TUs. The process then repeats Step 2 for each of these nodes, ensuring that rectangular TUs are split along the direction of the longer axis, so that rectangular TUs become thinner.

Embodiment 2

In this embodiment, Step 2b is modified so that nodes associated with rectangular TUs are split into multiple nodes, e.g., four nodes and four TUs. For example, an N/2×N TU is split into four N/8×N TUs. This partitioning into a larger number of TUs can be beneficial for cases where the data in the PU is different for different portions in the PU. Rather than require two levels of a binary tree to split one rectangular TU into four rectangular TUs, this embodiment requires only one quadtree level, and thus only one split-flag, to split one TU into four rectangular TUs. This embodiment can be predefined, or can be signaled as a "multiple split-flag" in the bit stream, similar to the way the implicit flag was signaled.

Embodiment 3

Here, Step 1 is modified so that nodes associated with square TUs are not merged to become rectangular until the size of the square TU is less than a predefined threshold. For example, if the threshold is four, then a rectangular 8×4 PU may be covered by two 4×4 TUs. A 4×2 PU, however, may not be covered by two 2×2 TUs. In this case, Embodiment 1 is applied, and the two nodes are merged to form a 4×2 TU to cover the 4×2 PU. This embodiment is useful for cases where square TUs are preferred due to performance or complexity considerations, and rectangular TUs are used only when the square TUs lose effectiveness due to their small dimensions.

Embodiment 4

In this embodiment, Step 2b is modified so that nodes associated with rectangular TUs can be split to form more than two square or rectangular TUs, where the split is not necessarily aligned with the longer dimension of the rectangle. For example, a 16×4 TU can be split into four 4×4 TUs or two 8×4 TUs. The choice of whether to split into a square or rectangular TU can be explicitly indicated by a flag in the bit-stream, as was the case for the implicit flag, or it can be predefined as part of the encoding/decoding process.

This embodiment is typically used for very large rectanglur TUs, e.g., 64×16, so that eight 16×16 TUs are used instead of two 64×8 TUs. Another example splits a 64×16 TU into four 32×8 TUs. A very long horizontal TU, for example, can produce artifacts such as ringing in the horizontal direction, so this embodiment reduces the artifacts by reducing the maximum length of a rectangular TU. This maximum length may also be included as a signal in the bit stream. Similarly, a maximum width can be specified.

Embodiment 5

In this embodiment, Step 1 is modified so that the N×N TU is directly split into rectangular TUs, i.e. other than size N/2×N/2. For example, the N×N TU can be split into four N/4×N TUs. This embodiment differs from Embodiment 2 in that a square TU can be split directly into multiple rectangular TUs, even though the PU may be square.

This embodiment is useful for cases where features in the PU are oriented horizontally or vertically, so that a horizontal or vertical rectangular TUs aligned with the direction of the features can be more effective than multiple square TUs that split the oriented data in the PU. Features can include, color, edges, ridges, corners, objects and other points of interest. As before, whether or not to do this kind of splitting can be predefined or be signaled, as was the case for the implicit split-flag.

Embodiment 6

In this embodiment, Step 1 is modified so that a TU can span multiple PUs. This can occur when the PUs are Inter-predicted. For example, Inter-predicted PUs are predicted using data from previously-decoded pictures, not from data decoded from within the same CU. A transform can therefore be applied over multiple PUs within a CU.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for coding pictures, comprising the steps of:
    parsing a bitstream including coded pictures to obtain split-flags for generating a transform tree, and a partitioning of coding units (CUs) into Prediction Units (PUs);
    generating the transform tree according to the split-flags, wherein nodes in the transform tree represent transform units (TUs) associated with the CUs, wherein the generating further comprises;
    splitting each TUs only if the split-flag is set;
    merging, for each PU that includes multiple TUs, the multiple TUs into a larger TU,
    modifying the transform tree according to the splitting and merging; and
    decoding data contained in each PU using the TUs associated with the PU according to the transform tree, wherein the steps are performed in a processor.

2. The method of claim 1, wherein square TUs are split into multiple rectangular TUs.

3. The method of claim 1, further comprising:
    repeating the splitting, merging and modifying until a size of each TU is equal to a predetermined minimum.

4. The method of claim 3, wherein the repeating continues when the TU for a particular node is not contained entirely within the associated PU.

5. The method of claim 1, wherein the bitstream includes an implicit-split flag, and if the implicit, split-flag is not set, then the split-flag is signaled in the bitstream for the corresponding node in the transform tree.

6. The method of claim 3, wherein the bitstream includes an implicit-split flag, and the repeating is performed only if the implicit split-flag is set and a predefined split condition is met.

7. The method of claim 1, wherein the splitting of a rectangular TU is along a direction of a longer axis of the rectangular TU.

8. The method of claim 1, wherein the splitting produces more than two TUs.

9. The method of claim 1, wherein a maximum length or a maximum width of the TUs are reduced.

10. The method of claim 1, wherein the PUs have arbitrary shapes and sizes.

11. The method of claim 1, wherein the splitting produces rectangular TUs.

12. The method of claim 1, wherein horizontal rectangular TUs and vertical rectangular TUs are aligned with a direction of features in the PU.

13. The method of claim 1, wherein the PU contains a portion of video data.

14. The method of claim 1, wherein the PU contains residual data obtained from a prediction process.

15. The method of claim 1, wherein the transform tree is an N-ary tree.

16. The method of claim 1, wherein the splitting of rectangular TUs is along a direction of a shorter axis.

17. The method of claim 1, wherein square or rectangular TUs are merged into larger TUs.

18. The method of claim 15, wherein values of N of the N-ary tree differs for different nodes of the transform tree.

19. The method of claim 1, wherein the TU spans multiple PUs when the PUs are Inter-predicted.

20. The method of claim 1, wherein the TUs are represented by leaf nodes of the transform tree.

* * * * *